July 8, 1941.   P. FEELEY ET AL   2,248,617
ARTICLE MADE OF CELLOPHANE
Filed Jan. 7, 1939
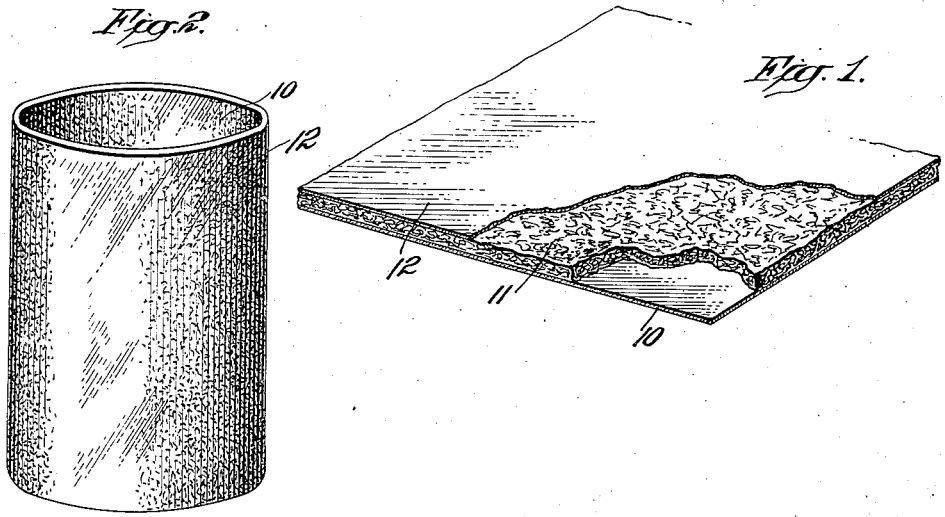
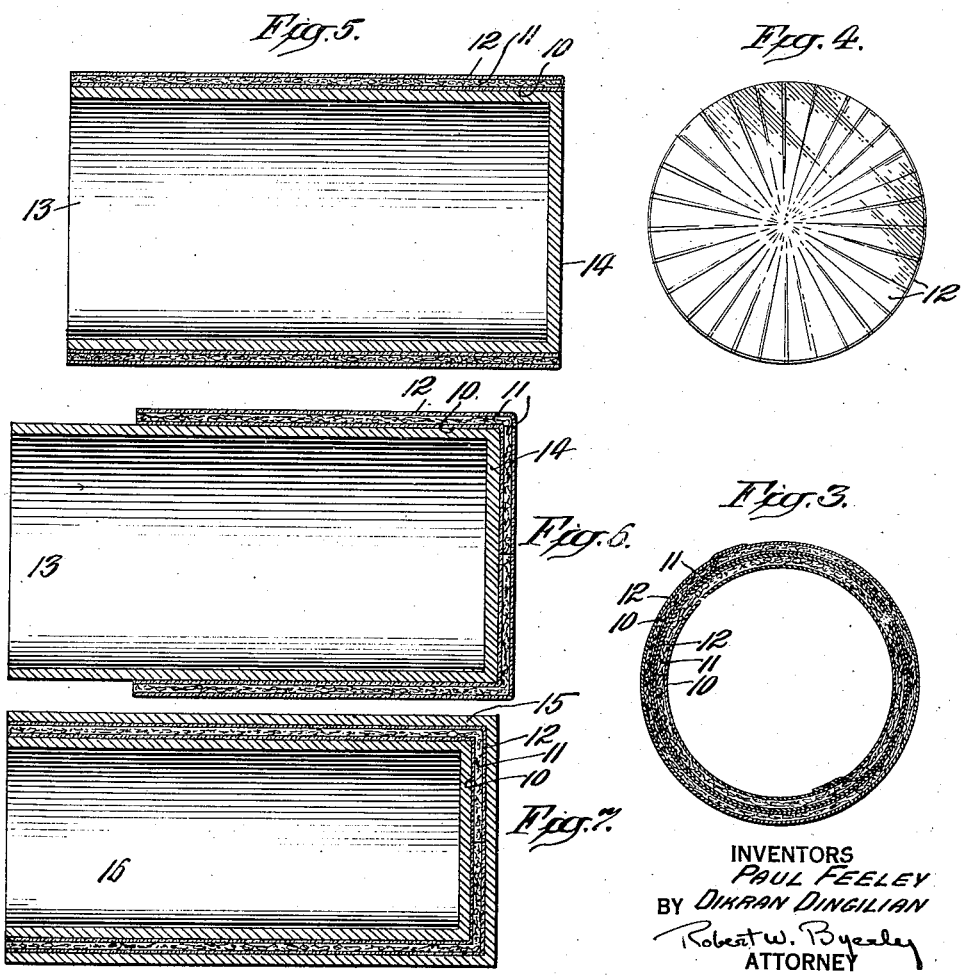
INVENTORS
PAUL FEELEY
BY DIKRAN DINGILIAN
Robert W. Byerley
ATTORNEY Patented July 8, 1941

2,248,617

UNITED STATES PATENT OFFICE 2,248,617

ARTICLE MADE OF CELLOPHANE

Paul Feeley and Dikran Dingilian, New York, N. Y.

Application January 7, 1939, Serial No. 249,692

1 Claim. (Cl. 154—46)

This invention relates to articles made of Cellophane, and to a method of making such articles.

Cellophane, as is well-known, is flexible, transparent sheet material. One of the main uses of Cellophane is for wrapping packages. It has also been proposed to use Cellophane for making artificial flowers and for other purposes where no structural strength is required.

The present invention is based upon the discovery that articles having considerable structural strength can be made from Cellophane. This is accomplished, according to the invention, by incorporating between two layers of sheet Cellophane a relatively thick mass of crumpled Cellophane which is moistened and secured to the sheets of Cellophane by an adhesive. The laminated or sandwich-like structure thus produced can be formed into various desired shapes before the adhesive dries, and when the adhesive dries the resulting material becomes rigid and retains its shape due to the properties of the hardened Cellophane filler between the layers of sheet Cellophane. In its preferred form, the structural material is translucent, but non-transparent, and has a somewhat crinkly appearance which is unusual and attractive.

In order to illustrate the nature of the invention, a specific example will be described with reference to the accompanying drawing, wherein:

Fig. 1 is a perspective view, partly broken away, showing a sheet of structural Cellophane according to the invention;

Fig. 2 is a perspective view of a waste basket made of the material illustrated in Fig. 1;

Fig. 3 is a horizontal section taken through the basket of Fig. 2;

Fig. 4 is an end view of the basket shown in Fig. 2;

Fig. 5 is a sectional view showing one manner of applying the material to a form;

Fig 6 is a view similar to Fig. 5, showing how the bottom of the basket may be formed; and Fig. 7 is a section illustrating a modified method of manufacture.

With reference to Fig. 1, the structural Cellophane material can be made by taking a sheet of Cellophane 10 and placing thereon a relatively thick mass of crumpled Cellophane 11 which has been moistened with a water-soluble adhesive, such as dextrine glue. The Cellophane used for this purpose may be sheet Cellophane which has been crumpled or bunched into a mass, and which has been thoroughly mixed with and soaked by the adhesive, or it may be scrap Cellophane similarly treated. It will be understood that the term "crumpled" includes relatively thick masses of Cellophane such as those made by folding the sheet Cellophane back onto itself a number of times to produce the desired thickness, or by otherwise ridging or twisting the material. Over the Cellophane mass 11 there is applied another sheet of Cellophane 12, and the laminated material is then formed into an article of any desired shape. When the adhesive dries, the filler solidifies and adheres to the sheets of Cellophane. When the material hardens, it contracts slightly. The resulting material possesses considerable structural strength and rigidity.

Although the material according to the invention can be used for making various articles, it is particularly adapted for making articles which must have substantial structural strength, such as wastebaskets. The basket illustrated in Figs. 2, 3 and 4 may be made by wrapping a sheet of the material described, while it is still pliable, around a suitable rigid form 13, so that when the material hardens it constitutes the circular wall of the basket. The ends of the material thus wrapped on the form may be joined in any convenient way, for instance by making one of the sheets of Cellophane 10 or 12 extra long, wrapping the same over the other end of the material, and securing it thereto by means of adhesive, as shown in Fig. 3. Preferably, two or more layers of the laminated material are superimposed, although a single layer may suffice, depending upon the thickness of the crumpled Cellophane used in making the laminated material. The bottom of the basket may comprise a separate piece of laminated material secured in any convenient way to the side walls of the basket, or, as shown in Fig. 6, the bottom of the basket may be formed integral with the side walls by bending the laminated material over the end 14 of the form, the material being folded back onto itself or bunched, as illustrated in Fig. 4. Over the entire basket, thus far described, there may be applied an outer sheet of Cellophane, which can be secured by means of adhesive.

According to another method of carrying out the present invention, a hollow mold 15 can be lined with a sheet of Cellophane, as best shown in Fig. 7, and the crumpled Cellophane material can be packed against this sheet in the interior of the mold. Another sheet of Cellophane can then be applied over the crumpled material and an inner mold 16 can be inserted so as to even out any irregularities in the thickness of the filler. The article can then be removed from the mold, and allowed to dry. When the adhesive dries out, the filler between the layers of Cellophane sets to a rigid condition, so that the resulting article retains its shape, and possesses considerable structural strength.

Although different types of adhesive may be employed, it is preferable to use a dextrine glue which may be made by dissolving dextrine in water to produce a paste. This type of adhesive is particularly advantageous in that it softens the Cellophane properly, and yet results in a finished article which is translucent. Other suitable adhesives are those made by National Adhesives Company, Nos. 2D90, 2D375 and Cellu gum No. 370. If an animal glue is employed, it tends to give the article a much darker shade. The Cellophane which is employed is preferably ordinary Cellophane, that is to say, not moisture-proofed. The term "Cellophane" is not used herein in a technical sense, but means the flexible, transparent material made from regenerated cellulose and commonly referred to as Cellophane.

What is claimed is:

A hollow, translucent, self-sustaining article having curved walls consisting of material in the form of a sandwich composed of two outside layers of normally flexible sheet Cellophane having between them a thick mass of crumpled Cellophane covered with a clear and water-soluble adhesive which secures the thick mass of crumpled Cellophane to the layers of sheet Cellophane, said sandwich-like walls being rigid whereby the article possesses sufficient structural strength so that it retains its shape in the absence of a supporting frame.

PAUL FEELEY.
DIKRAN DINGILIAN.